United States Patent
Yang et al.

(10) Patent No.: US 9,951,169 B2
(45) Date of Patent: Apr. 24, 2018

(54) AQUEOUS COATING COMPOSITION AND PROCESS OF MAKING THE SAME

(71) Applicants: Dow Global Technologies LLC, Midland, MI (US); Rohm and Haas Company, Philadelphia, PA (US)

(72) Inventors: Xiaohong Yang, Shanghai (CN); Tao Wang, Highton (AU)

(73) Assignees: Dow Globel Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/531,485

(22) PCT Filed: Sep. 28, 2015

(86) PCT No.: PCT/CN2015/090902
§ 371 (c)(1),
(2) Date: May 30, 2017

(87) PCT Pub. No.: WO2016/095583
PCT Pub. Date: Jun. 23, 2016

(65) Prior Publication Data
US 2017/0275408 A1    Sep. 28, 2017

(30) Foreign Application Priority Data
Dec. 19, 2014   (WO) ................ PCT/CN2014/094339

(51) Int. Cl.
| | | |
|---|---|---|
| *C09D 143/02* | (2006.01) | |
| *C09D 133/02* | (2006.01) | |
| *C08F 265/06* | (2006.01) | |
| *C08F 220/18* | (2006.01) | |
| *C08F 220/14* | (2006.01) | |
| *C08F 220/06* | (2006.01) | |
| *C08F 230/02* | (2006.01) | |
| *C08F 220/58* | (2006.01) | |
| *C08F 2/22* | (2006.01) | |

(52) U.S. Cl.
CPC .............. *C08F 265/06* (2013.01); *C08F 2/22* (2013.01); *C08F 220/06* (2013.01); *C08F 220/14* (2013.01); *C08F 220/18* (2013.01); *C08F 220/58* (2013.01); *C08F 230/02* (2013.01)

(58) Field of Classification Search
USPC ....................................................... 524/502
See application file for complete search history.

(56) References Cited

U.S. PATENT DOCUMENTS

| 4,654,397 | A | 3/1987 | Mueller-Mall et al. |
|---|---|---|---|
| 4,876,313 | A | 10/1989 | Lorah |
| 5,270,380 | A | 12/1993 | Adamson et al. |
| 5,962,571 | A | 10/1999 | Overbeek et al. |
| 6,872,789 | B2 | 3/2005 | Brinkhuis et al. |
| 7,569,636 | B2 | 8/2009 | Tennebroek et al. |
| 8,013,050 | B2 | 9/2011 | Mestach et al. |
| 8,501,855 | B2 | 8/2013 | Dombrowski et al. |
| 2003/0199629 | A1 | 10/2003 | Gelman et al. |
| 2004/0039089 | A1 | 2/2004 | Buckmann et al. |
| 2005/0107527 | A1 | 5/2005 | Holub et al. |
| 2006/0217483 | A1 | 9/2006 | Tennebroek et al. |
| 2008/0146724 | A1 | 6/2008 | Bohling et al. |
| 2009/0143528 | A1 | 6/2009 | Mestach et al. |
| 2011/0237736 | A1 | 9/2011 | Roller et al. |
| 2012/0252972 | A1 | 10/2012 | Balk et al. |
| 2014/0005322 | A1* | 1/2014 | Akkerman ............ C08F 220/18 524/501 |
| 2014/0018473 | A1 | 1/2014 | Ratering et al. |
| 2014/0323608 | A1 | 10/2014 | Deller et al. |
| 2015/0004420 | A1 | 1/2015 | Hill et al. |

FOREIGN PATENT DOCUMENTS

| CA | 2611131 A1 | 12/2006 |
|---|---|---|
| CN | 104169078 A | 11/2014 |
| EP | 1686160 A1 | 8/2006 |
| EP | 2159235 A1 | 3/2010 |
| TW | 201245357 A | 11/2012 |
| WO | 2010027487 A1 | 3/2010 |
| WO | 2012087920 A1 | 6/2012 |
| WO | 2012130712 A1 | 10/2012 |
| WO | 2013087461 A1 | 6/2013 |
| WO | 2013113936 A1 | 8/2013 |
| WO | 2014190515 A1 | 12/2014 |

OTHER PUBLICATIONS

A. J. Leo, Chemical Reviews, vol. 93, No. 4 pp. 1281-1305 (1993).
Brandrup, J. et al.; Polymer Handbook, vol. 1; 1999; pp. VI/209-VI/258.
International Search Report for International Application No. PCT/CN2014/094339; Date of Filing: Dec. 19, 2014; dated Jul. 17, 2015; 3 pages.
International Search Report for International Application No. PCT/CN2015/090902; Date to Filing: Sep. 28, 2015; dated Dec. 28, 2015; 4 pages.

(Continued)

*Primary Examiner* — Vu A Nguyen
(74) *Attorney, Agent, or Firm* — Karl E. Stauss; Cantor Colburn LLP

(57) ABSTRACT

An aqueous coating composition having an extended open time and capable of providing coating films with good properties including stain resistance and block resistance, a process of preparing the aqueous coating composition, and a method of extending open time of an aqueous coating composition.

14 Claims, No Drawings

(56) References Cited

OTHER PUBLICATIONS

Written Opinion for the International Searching Authority for International Application No. PCT/CN2015/090902; Date of Filing: Sep. 28, 2015; dated Dec. 28, 2015; 4 pages.
Written Opinion of the International Searching Authority for International Application No. PCT/CN2014/094339; Date of Filing: Dec. 19, 2014; dated Jul. 17, 2015; 4 pages.

* cited by examiner

AQUEOUS COATING COMPOSITION AND PROCESS OF MAKING THE SAME

FIELD OF THE INVENTION

The present invention relates to an aqueous coating composition and a process of making the same.

INTRODUCTION

Water based trim enamel using waterborne acrylic polymers is a popular do-it-yourself (DIY) segment in Australia, New Zealand, Europe and North America, which has successfully replaced most of solvent based alkyd products and applied onto doors, windows and some furniture. Compared to solvent based alkyd paints, one of drawbacks for waterborne acrylic paints is short open time. For example, coating compositions comprising waterborne acrylic polymers usually have a wet edge time less than 1 minute and a repair time less than 3 minutes. Open time is important in aqueous coatings, such as latex paints, to permit rebrushing over a freshly coated wet surface without causing defects such as brush marks or lap lines in the final dried coating.

Attempts have been made to prolong the open time of coating compositions comprising waterborne acrylic latexes. One method for improving the open time of an aqueous coating is disclosed in U.S. Pat. No. 5,270,380. This method involves the reactive interaction between a latex polymer and a modifying compound in which the latex polymer and modifying compound become chemically bound. The problem is that a given modifying compound will only work with a limited number of latex polymers, and therefore many different modifying compounds are required to effect an open time improvement across the wide range of possible latex polymers used in different coating compositions.

Traditionally, glycols have been used in coating compositions to increase open time, but most of glycols are volatile organic compounds (VOCs), which are less environmentally friendly and less desirable than aqueous systems.

Introducing conventional open time extenders (OTEs) into aqueous acrylic polymer binders can also extend open time of the obtained coating compositions. As these OTEs usually have surfactant nature, addition of OTEs may increase water sensitivity of coating films, decrease stain and scrub resistance, and compromise block resistance and wet adhesion to aged alkyd coatings. Moreover, water based enamel paints are required to have sufficient water resistance and chemical resistance to meet industry requirements.

Therefore, it is desirable to provide an aqueous coating composition that shows extended open time and also is able to provide coating films made therefrom with desirable properties described above.

SUMMARY OF THE INVENTION

The present invention provides an aqueous coating composition that is a novel combination of an oligomer with an emulsion polymer. The aqueous coating composition of the present invention has an extended open time, for example, a wet edge time of 2 minutes or more and a repair time of 7 minutes of more (at 23° C. and 50% relative humidity, wet film thickness: 150±5 μm). The coating composition of the present invention provides coating films (dry film thickness: 50-60 microns) with a liquid stain resistance level of at least 3. The coating films also show one or more of the following properties: a water resistance (24 hours) level of at least 5, a block resistance (7 days) level of 7 or higher, and an ethanol resistance level ≥100 cycles. The open time, water resistance, block resistance and ethanol resistance are measured according to the test methods described in the Examples section.

In a first aspect, the present invention is an aqueous coating composition, comprising:

(i) an emulsion polymer having a weight average molecular weight more than 80,000;

(ii) an oligomer comprising as polymerized units, based on the weight of the oligomer, (a1) from 75% to 92% by weight of a hydrophilic (meth) acrylic acid alkyl ester;

(a2) from 2.1% to 10% by weight of diacetone (meth) acrylamide; and (a3) from 5% to 15% by weight of acid monomers comprising from 4% to 14% by weight of an $\alpha,\beta$-ethylenically unsaturated carboxylic acid and from 1% to 9% by weight of a phosphorous-containing acid monomer;

wherein the oligomer has a weight average molecular weight of from 6,000 to 30,000; and the oligomer is present in an amount of from 1% to 7.5% by weight, based on the dry weight of the emulsion polymer; and (iii) a polyfunctional carboxylic hydrazide containing at least two hydrazide groups per molecule.

In a second aspect, the present invention is a process of preparing the aqueous coating composition of the first aspect. The process comprises:

admixing the emulsion polymer, the oligomer, and the polyfunctional carboxylic hydrazide containing at least two hydrazide groups per molecule.

In a third aspect, the present invention is a method of extending open time of an aqueous coating composition comprising an emulsion polymer and a polyfunctional carboxylic hydrazide containing at least two hydrazide groups per molecule. The method comprises:

admixing the emulsion polymer and the polyfunctional carboxylic hydrazide with an oligomer, wherein the emulsion polymer has a weight average molecular weight more than 80,000, and the oligomer comprises as polymerized units, based on the weight of the oligomer, (a1) from 75% to 92% by weight of a hydrophilic (meth) acrylic acid alkyl ester;

(a2) from 2.1% to 10% by weight of diacetone (meth) acrylamide; and (a3) from 5% to 15% by weight of acid monomers comprising from 4% to 14% by weight of an $\alpha,\beta$-ethylenically unsaturated carboxylic acid and from 1% to 9% by weight of a phosphorous-containing acid monomer;

wherein the oligomer has a weight average molecular weight of from 6,000 to 30,000; and the oligomer is present in an amount of from 1% to 7.5% by weight, based on the dry weight of the emulsion polymer.

DETAILED DESCRIPTION OF THE INVENTION

"Open time" in the present invention is the time period after coating application, during which the particle mobility is sufficiently high to allow correction on the film without that coating defects like the stroke of the brush, lapping lines from lap lines from overlapping film layers, or edge effects are visible in the final dry coating. Open time can be determined by both wet edge time and repair time.

"Hydrophilic" monomer in the present invention refers to a monomer that has a Hansch value <2.20. Hansch values may be determined by the method described by A. J. Leo in Chem. Rev., Volume 93, Issue No. 4, page 1281 (1993).

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

Glass transition temperature ($T_g$) values in the present invention are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of $M_1$, and $T_g(M_2)$ is the glass transition temperature of the homopolymer of $M_2$, all temperatures being in K. The glass transition temperatures of monomers may be found, for example, in "Polymer Handbook", edited by J. Brandrup and E H Immergut, Interscience Publishers.

The aqueous coating composition of the present invention comprises one or more oligomers. The oligomer useful in the present invention may comprise as polymerized units, monomer (a1), one or more hydrophilic (meth)acrylic acid alkyl esters. The hydrophilic (meth)acrylic acid alkyl ester may be a (meth)acrylic acid alkyl ester having a $C_1$ to $C_2$ alkyl group. Examples of suitable hydrophilic (meth)acrylic acid alkyl esters include methyl (meth)acrylate, ethyl (meth) acrylate, or mixtures thereof. Preferred hydrophilic (meth) acrylic acid alkyl esters are methyl methacrylate, ethyl acrylate, or mixtures thereof. The oligomer may comprise, based on the weight of the oligomer, 75% by weight or more of the copolymerized hydrophilic (meth)acrylic acid alkyl ester, 80% by weight or more, or even 86% by weight or more, and at the same time, 92% by weight or less, or even 90% by weight or less. "Weight of the oligomer" in the present invention refers to dry weight or solids weight of the oligomer.

The oligomer useful in the present invention may also comprise as polymerized units, monomer (a2), diacetone (meth)acrylamide, and preferably diacetone acrylamide (DAAM). The diacetone (meth)acrylamide may be used as a self-crosslinking agent. The oligomer may comprise, based on the weight of the oligomer, 2.1% by weight or more of the copolymerized diacetone (meth)acrylamide, 3% by weight or more, or even 4% by weight or more, and at the same time, 10% by weight or less, 8% by weight or less, or even 6% by weight or less.

Preferably, the oligomer is substantially free of, as polymerized units, an acetoacetoxyethyl (meth)acrylate. "Substantially free" means that the oligomer comprises, as polymerized units, from 0 to less than 0.2% by weight of the acetoacetoxyethyl (meth)acrylate, less than 0.1% by weight, or even less than 0.01% by weight, based on the weight of the oligomer.

The oligomer useful in the present invention may further comprise as polymerized units, monomer (a3), acid monomers comprising one or more α,β-ethylenically unsaturated carboxylic acids and phosphorous-containing acid monomers. The combined concentration of the copolymerized acid monomers in the oligomer may be, based on the weight of the oligomer, 5% by weight or more, 7% by weight or more, or even 9% by weight or more, and at the same time, 15% by weight or less, 13% by weight or less, or even 11% by weight or less.

Examples of suitable α,β-ethylenically unsaturated carboxylic acids include an acid-bearing monomer such as (meth)acrylic acid, itaconic acid, or fumaric acid; or a monomer bearing an acid-forming group which yields or is subsequently convertible to, such an acid group (such as anhydride, (meth)acrylic anhydride, or maleic anhydride); or mixtures thereof. The oligomer may comprise, based on the weight of the oligomer, 4% by weight or more of the copolymerized α,β-ethylenically unsaturated carboxylic acids, 5% by weight or more, or even 6.8% by weight or more, and at the same time 14% by weight or less, 10% by weight or less, or even 8% by weight or less.

Examples of suitable phosphorous-containing acid monomers include phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R)-C(O)-O-(R_1O)_n-P(O)(OH)_2$, wherein $R=H$ or $CH_3$ and $R_1=$alkyl, such as SIPOMER™ PAM-100, SIPOMER PAM-200, and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorus-containing acid monomers are dihydrogen phosphate monomers, which include 2-phosphoethyl (meth)acrylate, 2-phosphopropyl (meth) acrylate, 3-phosphopropyl (meth)acrylate, 3-phospho-2-hydroxypropyl (meth)acrylate, SIPOMER PAM-100, SIPOMER PAM-200, SIPOMER PAM-300, or mixtures thereof. The oligomer may comprise, based on the weight of the oligomer, 1% by weight or more of the copolymerized phosphorous-containing acid monomers, or 3% by weight or more, and at the same time, 9% by weight or less, 6% by weight or less, or even 4% by weight or less.

Preferably, the oligomer useful in the present invention comprises as polymerized units, based on the weight of the oligomer, (a1) from 80% to 90% by weight of the hydrophilic (meth)acrylic acid alkyl ester such as methyl (meth)acrylate, ethyl (meth)acrylate, or mixtures thereof.

(a2) from 3% to 6% by weight of diacetone (meth) acrylamide such as DAAM; and (a3) from 7% to 13% by weight of the acid monomers, wherein the acid monomers comprise from 5% to 10% by weight of the α,β-ethylenically unsaturated carboxylic acid such as (meth)acrylic acid, itacolic acid, fumaric acid, or mixtures thereof; and from 3% to 6% by weight of the phosphorous-containing acid monomer such as phosphoethyl (meth)acrylate, SIPOMER PAM-100, SIPOMER PAM-200, SIPOMER PAM-300, or mixtures thereof.

The types and levels of the monomers described above may be chosen to provide the oligomer with a $T_g$ suitable for different applications. The oligomer useful in the present invention may have a $T_g$ of from 50° C. to 110° C., from 60° C. to 110° C., or from 70° C. to 110° C.

The oligomer useful in the present invention may have a weight average molecular weight ($M_w$) of 6,000 or more, 7,000 or more, 8,000 or more, 9,000 or more, 10,000 or more, or even 11,000 or more, and at the same time, 30,000 or less, 28,000 or less, 27,000 or less, 26,000 or less, 25,000 or less, 24,000 or less, 22,000 or less, or even 20,000 or less. $M_w$ may be determined by Size Exclusion Chromatography (SEC) analysis using a polystyrene standard.

The oligomer in the aqueous coating composition of the present invention may be present, by weight based on the dry weight of the emulsion polymer described below, in an amount of 1.0% or more, 1.3% or more, 2% or more, 3% or more, 3.5% or more, or even 4% or more, and at the same time, 7.5% or less, 7% or less, 6.5% or less, 5.5% or less, or even 5% or less. The weight percentage of the oligomer in the present invention, based on the dry weight (or solids weight) of the emulsion polymer, refers to the percentage by dry weight (or solids weight) of the oligomer.

Preferably, the aqueous coating composition comprises, based on the dry weight of the emulsion polymer described below, from 1.3% to 7% by weight, and preferably from 2% to 6% by weight of the oligomer having a $M_w$ of from 6,000 to 17,000. Also preferably, the aqueous coating composition comprises, based on the dry weight of the emulsion polymer, from 4% to 7% by weight, and preferably from 5% to 7% by weight of the oligomer having a $M_w$ of bigger than 17,000 and up to 28,000.

The aqueous coating composition of the present invention also comprises one or more emulsion polymers. "Emulsion polymers" in the present invention refer to polymers having a $M_w$ of 80,000 or more, 100,000 or more, or even 200,000 or more. $M_w$ may be determined by SEC analysis using a polystyrene standard. The emulsion polymer may be selected from an acrylic polymer, a styrene-acrylic copolymer, a blend of polyurethane and an acrylic polymer or copolymer, a polyurethane-acrylic hybrid polymer, or mixtures thereof. The emulsion polymer is preferably an acrylic emulsion polymer.

Preferably, the emulsion polymer comprises, as polymerized units, diacetone (meth)acrylamide such as DAAM. The emulsion polymer may comprise, based on the dry weight of the emulsion polymer, from 0 to 10% by weight of the copolymerized diacetone (meth)acrylamide, for example, 0.3% by weight or more or 1.0% by weight or more, and at the same time, 10% by weight or less, 7% by weight or less, or even 5% by weight or less.

The emulsion polymer useful in the present invention may further comprise, as polymerized units, one or more nonionic monoethylenically unsaturated monomers. Nonionic monomers refer to monomers that do not bear an ionic charge between pH=1-14. Examples of suitable nonionic monoethylenically unsaturated monomers include (meth)alkyl or alkenyl esters of (meth)acrylic acid, such as methyl (meth)acrylate, ethyl(meth)acrylate, butyl(meth)acrylate, 2-ethylhexyl(meth)acrylate, hydroxyethyl(meth)acrylate, hydroxypropyl(meth)acrylate, benzyl(meth)acrylate, lauryl (meth)acrylate, oleyl(meth)acrylate, palmityl (meth)acrylate, stearyl(meth)acrylate, nonyl(meth)acrylate, decyl (meth)acrylate and the like; (meth)acrylonitrile; acrylamide; or mixtures thereof. Preferred nonionic monoethylenically unsaturated monomers are butyl acrylate, methyl(meth)acrylate, 2-ethylhexyl(meth)acrylate, or mixtures thereof. Other suitable nonionic monoethylenically unsaturated monomers may be further added, for example, styrene and substituted styrene such as .alpha.-methyl styrene, p-methyl styrene, t-butyl styrene, vinyltoluene; ethylene, propylene, 1-decene; or other vinyl monomers such as vinyl acetate, vinyl butyrate, vinyl versatate and other vinyl esters, vinyl chloride, vinylidene chloride or mixtures thereof. The emulsion polymer may comprise as polymerized units, based on the dry weight of the emulsion polymer, from 75% to 90% by weight or from 80% to 85% by weight of the nonionic monoethylenic ally unsaturated monomer.

The emulsion polymer useful in the present invention may further comprise, as polymerized units, one or more acid monomers selected from $\alpha,\beta$-ethylenically unsaturated carboxylic acids, phosphorous-containing acid monomers, or mixtures thereof. Suitable acid monomers for making the emulsion polymer include those described above for use in the preparation of the oligomer. Preferably, the emulsion polymer comprises, as polymerized units, one or more $\alpha,\beta$-ethylenically unsaturated carboxylic acids, such as methacrylic acid (MAA) and itaconic acid. The emulsion polymer may comprise as polymerized units, based on the dry weight of the emulsion polymer, from 0 to 10% by weight of the acid monomers, for example, 0.5% by weight or more, 1.0% by weight or more, or even 2.0% by weight or more, and at the same time, 8% by weight or less or 6% by weight or less.

The emulsion polymer useful in the present invention may further comprise one or more multiethylenically unsaturated monomers. Examples of suitable multiethylenically unsaturated monomers include butadiene, allyl(meth)acrylate, divinyl benzene, or mixtures thereof. The emulsion polymer may comprise as polymerized units, based on the dry weight of the emulsion polymer, from 0 to 5% by weight of the multiethylenically unsaturated monomer, from 0.1% to 3% by weight, or from 0.5% to 1.5% by weight.

The emulsion polymer useful in the present invention may have a $T_g$ of from 0° C. to 60° C. or from 10° C. to 50° C. The emulsion polymer particles may have a particle size of from 50 nanometers (nm) to 500 nm, from 70 nm to 300 nm, or from 70 nm to 250 nm.

The process of preparing the oligomer or the emulsion polymer useful in the present invention may be conducted by free-radical polymerization, such as suspension polymerization or emulsion polymerization, of the monomers described above. Emulsion polymerization is a preferred process. Total weight concentration of monomers for preparing the oligomer and the emulsion polymer, respectively, is equal to 100%. A mixture of monomers for preparing the oligomer or the emulsion polymer, respectively, may be added neat or as an emulsion in water; or added in one or more additions or continuously, linearly or nonlinearly, over the reaction period of preparing the oligomer or the emulsion polymer, or combinations thereof. Temperature suitable for emulsion polymerization processes may be lower than 100° C., in the range of from 30 to 95° C., or in the range of from 50 to 90° C. Multistage free-radical polymerization using the monomers described above can be used, which at least two stages are formed sequentially, and usually results in the formation of the multistage polymer comprising at least two polymer compositions. The emulsion polymer useful in the present invention is preferably prepared by multistage emulsion polymerization.

In the polymerization process of preparing the oligomer or the emulsion polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process of preparing the oligomer and the emulsion polymer, respectively, a surfactant may be used. The surfactant may be added prior to or during the polymerization of the monomers, or combinations thereof. A portion of the surfactant can also be added after the polymerization. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The surfactant used is usually from 0.1% to 6% by weight, preferably from 0.3% to 1.5% by weight, based on the weight of total monomers used for preparing the oligomer or the emulsion polymer, respectively.

In the polymerization process of preparing the oligomer and the emulsion polymer, respectively, a train transfer agent may be used. Examples of suitable chain transfer agents include 3-mercaptopropionic acid, dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the oligomer or the emulsion polymer. For example, the chain transfer agent may be used in preparing the oligomer in an amount of from 0.3% to 3% by weight based on the total weight of monomers used for preparing the oligomer. When preparing the emulsion polymer, the chain transfer agent may be used in an amount of from 0.01% to 0.5% by weight, based on the total weight of monomers used for preparing the emulsion polymer.

After completing the polymerization of the oligomer or the emulsion polymer, the obtained oligomer or emulsion polymer may be neutralized by one or more bases as neutralizers to a pH value, for example, at least 6, from 6 to 10, or from 7 to 9. The bases may lead to partial or complete neutralization of the ionic or latently ionic groups of the oligomer or the emulsion polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

In addition to the oligomer and emulsion polymer particles, the aqueous coating composition of the present invention may further comprise a polyfunctional carboxylic hydrazide containing at least two hydrazide groups per molecule. The polyfunctional carboxylic hydrazides may act as a crosslinker and may be selected from adipic dihydrazide, oxalic dihydrazide, isophthalic dihydrazide, polyacrylic polyhydrazide, or mixtures thereof. The concentration of the polyfunctional carboxylic hydrazide may be from 0.5% to 10% by weight, from 1% to 8% by weight, or from 1.5% to 6% by weight, based on the weight of the oligomer.

The aqueous coating composition of the present invention may also comprise pigments and/or extenders. "Pigments" herein refer to materials that can provide whiteness and color including inorganic pigments and organic pigments. Inorganic pigments typically include metal oxides. Examples of suitable metal oxides include titanium dioxide ($TiO_2$), zinc oxide, iron oxide, zinc sulfide, barium sulfate, barium carbonate, or mixture thereof. In a preferred embodiment, pigment used in the present invention is $TiO_2$. $TiO_2$ typically exists in two crystal forms, anastase and rutile. Suitable commercially available $TiO_2$ include, for example, KRONOS™ 2310 available from Kronos Worldwide, Inc., Ti-Pure™ R-706 available from DuPont (Wilmington, Del.), TiONA™ AT1 available from Millenium Inorganic Chemicals, or mixtures thereof. $TiO_2$ may be also available in concentrated dispersion form. Organic pigments typically refer to opaque polymers such as ROPAQUE™ Ultra E available from The Dow Chemical Company (ROPAQUE is a trademark of The Dow Chemical Company). "Extenders" herein refer to white transparent or semi-transparent components, whose purpose is to reduce the cost of the coating by increasing the area covered by a given weight of pigment. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, or mixtures thereof. The concentration of the pigments and/or extenders may be, based on the total weight of the coating composition, from 0 to 60% by weight, from 5% to 35% by weight, or from 10% to 30% by weight.

The aqueous coating composition of the present invention may further comprise one or more matting agents. "Matting agents" herein refer to any inorganic or organic particles that provide matt effect. Matting agents usually have an average particle size of 5.5 microns or more according to the ASTM E2651-10 method. The matting agents may be selected from silica matting agents, polyurea matting agents, polyacrylate, polyethylene, polytetrafluoroethene, or mixtures thereof. Suitable commercially available matting agents include, for example, ACEMATT™ TS-100 and ACEMATT OK520 silica matting agents both available from Evonik, DEUTERON™ MK polyurea matting agent available from Deuteron, SYLOID™ Silica 7000 matting agent available from Grace Davison, PARALOID™ PRD 137B emulsion based on polyacrylate available from The Dow Chemical Company; ULTRALUBE™ D277 emulsion based on HDPE/plastic, ULTRALUBE D818 emulsion based on montan/PE/plastic, and ULTRALUBE D860 emulsion based on PE/ester matting agents all available from Keim-Additec; or mixtures thereof. The concentration of the matting agent may be, based on the total weight of the coating composition, from 0 to 5% by dry weight, from 0.1% to 4% by dry weight, or from 0.5% to 3.5% by dry weight.

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO™ Airex 902 W and TEGO Foamex 1488 polyether siloxane copolymer emulsions both available from TEGO, BYK™-024 silicone deformer available from BYK, or mixtures thereof. The concentration of the defoamer may be, based on the total weight of the coating composition, generally from 0 to 1% by weight, from 0.01% to 0.8% by weight, or from 0.05% to 0.5% by weight.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR. The concentration of the thickener may be, based on the total weight of the aqueous coating composition, generally from 0 to 5% by weight, from 0.05% to 2% by weight, or from 0.1% to 1% by weight.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, SURFYNOL™ 104 nonionic wetting agent based on an actacetylenic diol available from Air Products, BYK-346 and BYK-349 polyether-modified siloxanes both available from BYK, or mixtures thereof. The concentration of the wetting agent may be, based on the total weight of the coating composition, from 0 to 5% by weight, 0.01% to 2% by weight, or from 0.2% to 1% by weight.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The concentration of the coalescents may be, based on the total weight of the coating composition, from 0 to 10% by weight, from 0.01% to 9% by weight, or from 1% to 8% by weight.

The aqueous coating composition of the present invention may further comprise water. The concentration of water may be, by weight based on the total weight of the aqueous coating composition, from 30% to 90%, from 40% to 80%, or from 50% to 70%.

In addition to the components described above, the aqueous coating composition of the present invention may further comprise any one or combination of the following additives: buffers, neutralizers, dispersants, humectants, mildewcides, biocides, anti-skinning agents, colorants, flowing agents, anti-oxidants, plasticizers, leveling agents, thixotropic agents, adhesion promoters, and grind vehicles. When present, these additives may be present in a combined amount of from 0.001% to 10% by weight, or from 0.01% to 2% by weight, based on the total weight of the coating composition.

The aqueous coating composition of the present invention may be prepared by admixing the oligomer, the emulsion polymer, and the polyfunctional carboxylic hydrazide with other optional components, e.g., pigments and/or extenders as described above. Components in the aqueous coating composition may be mixed in any order to provide the aqueous coating composition of the present invention. Any of the above-mentioned optional components may also be added to the composition during or prior to the mixing to form the aqueous coating composition. The oligomer useful in the present invention can be used in a millbase as a dispersant for pigment and/or extender, or be used at let-down stage. When the aqueous coating composition comprises pigment and/or extender, the pigments and/or extenders are preferably mixed with the oligomer to form a slurry of pigments and/or extender in the absence of a conventional dispersant. The addition of the oligomer will not decrease the viscosity of the coating composition like conventional open time extenders.

The aqueous coating composition of the present invention preferably has an extended open time. "Extended open time" means the open time of the coating composition comprising the oligomer is longer than the same composition absent an oligomer as measured in the same way under the same conditions. For example, the coating composition of the present invention, when applied to a substrate with a wet film thickness of 150±5 μm, has a wet edge time of 2 minutes or more and a repair time of at least 7 minutes, or at least 8 minutes at 23° C. and 50% relative humidity.

The aqueous coating composition of the present invention also provides coatings (dry film thickness: 50-60 μm) with a liquid stain resistance (e.g., wine, coffee, blur food dye and green tea) level of at least 3. The coatings also show one or more of the following properties: a water resistance (24 hours) level of at least 5, a block resistance (7 days) level of 7 or higher, and an ethanol resistance level ≥100 cycles and preferably ≥150 cycles. The open time, water resistance, block resistance and ethanol resistance are measured according to the test methods described in the Examples section.

The present invention also provides a method of preparing the coatings. The method may comprise: forming the aqueous coating composition of the present invention, applying the aqueous coating composition to a substrate, and drying, or allowing to dry, the applied coating composition to form the coating.

The present invention also provides a method of extending open time of an aqueous coating composition comprising the emulsion polymer and the polyfunctional carboxylic hydrazide described above. This method comprises: admixing the oligomer with the emulsion polymer and the polyfunctional carboxylic hydrazide described above. "Extending open time" means the coating composition has an extended open time as described above, that is, the open time of the coating composition with the addition of the oligomer is longer than the same coating composition in the absence of the oligomer as measured in the same way under the same conditions. That is, the coating composition of the present invention has a longer wet edge time and repair time, for example, when applied to a substrate with a wet film thickness of 150±5 µm, has a wet edge time being 2 minutes or more and the repair time being 7 minutes or more at 23° C. and 50% relative humidity.

A process of using the aqueous coating composition of the present invention may comprise the following: applying the coating composition to a substrate, and drying, or allowing to dry, the applied coating composition. The aqueous coating composition of the present invention can be applied to a substrate by incumbent means including brushing, dipping, rolling and spraying. The coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition can dry, or allow to dry, to form a film (this is, coating) at room temperature (20-25° C.), or at an elevated temperature, for example, from 35° C. to 60° C.

The aqueous coating composition of the present invention can be applied to, and adhered to, various substrates. Examples of suitable substrates include wood, metals, plastics, foams, stones, elastomeric substrates, glass, fabrics, concrete, or cementious substrates. The coating composition is suitable for various coating applications, such as marine and protective coatings, automotive coatings, wood coatings, coil coatings, plastic coatings, powder coatings, can coatings, and civil engineering coatings. The aqueous coating composition is particularly suitable for wood coatings. The aqueous coating composition can be used alone, or in combination with other coatings to form multi-layer coatings.

EXAMPLES

Some embodiments of the invention will now be described in the following Examples, wherein all parts and percentages are by weight unless otherwise specified. The following materials are used in the examples:

Methacrylic acid ("MAA"), itaconic acid ("IA"), methyl methacrylate ("MMA"), n-butyl acrylate ("BA"), ureido methacrylate ("UMA"), benzophonone ("BP"), and methyl 3-mercaptopropanoate ("MMP"), allyl methacrylate ("ALMA") are all available from Sinoreagent Group.

Diacetone acrylamide ("DAAM") and adipic dihydrazide ("ADH") are both available from Kyowa Hakko Chemical Co., Ltd.

Phosphoethyl methacrylate ("PEM") is available from The Dow Chemical Company.

Acetoacetoxyethyl methacrylate ("AAEM") is available from Eastman Chemical Company.

Ammonium persulphate ("APS") is available from Sinoreagent Group.

RHODAFAC™ RS-610-A25, available from Solvay, is a phosphate containing surfactant.

POLYSTEP™ B-11, available from Stepan, is an alcohol ethoxy sulfate.

DISPONIL Fes-32, available from BASF, is a fatty alcohol ether sulphate, sodium salt.

PRIMAL™ HG-3361, available from The Dow Chemical Company, is an ambient curing pure acrylic emulsion (PRIMAL is a trademark of The Dow Chemical Company).

OROTAN™ 731A, available from The Dow Chemical Company, is a sodium salt of a hydrophobic acrylic copolymer and used as a dispersant (OROTAN is a trademark of The Dow Chemical Company).

TERGITOL™ 15-S-9, available from The Dow Chemical Company, is a secondary alcohol ethoxylate, nonionic surfactant (TERGITOL is a trademark of The Dow Chemical Company).

BYK-022, available from BYK, is a VOC-free silicone-containing defoamer.

AMP™-95, available from The Dow Chemical Company, is 2-amino-2-methyl-1-propanol and used as a neutralizer (AMP is a trademark of The Dow Chemical Company).

Ti-Pure R-706, available from DuPont, is titanium dioxide and used as a pigment.

ACTICIDE™ EPW, available from Thor, is used as a biocide.

Triethylene glycol monoethyl ether, available from The Dow Chemical Company, is used as a solvent.

TEXANOL™ ester alcohol, available from Eastman Chemical Company, is 2,2,4-trimethyl-1,3-pentanediol monoisobutyrate and used as a co-solvent.

BYK-024, available from BYK, is a silicone defoamer.

ACRYSOL RM-5000, available from The Dow Chemical Company, is a non-ionic urethane rheology modifier.

ACRYSOL RM-8W rheology modifier ("RM-8W"), available from The Dow Chemical Company, is a nonionic urethane rheology modifier.

RHODAFAC™ RS-410, available from Solvay, is a phosphate ester surfactant.

GLUCOPON™ 425 N/HH, available from BASF, is an alkyl polyglycoside based on natural fatty alcohol C8-C14 and has a solids content of 50%.

The following standard analytical equipment and methods are used in the Examples.

Viscosity

Brookfield (BF) viscosity of a coating composition is measured at 25° C. using a Brookfield RV or RVT (5 rpm, #3 spindle). Low-shear or BF viscosity is measured according to the ASTM D1824 method ("Test Method for Apparent Viscosity of Plastisols and Organosols at Low Shear Rates by Brookfield Viscometer").

Stormer viscosity relates to the in-can appearance and is typically measured in Krebs units (KU) using a Stormer viscometer. Mid-shear or Stormer viscosity ("KU viscosity") is measured according to the ASTM D562-01 method ("Standard Test Method Consistency of Paints Measuring Krebs Unit (KU) Viscosity Using a Stormer-Type Viscometer").

ICI viscosity represents the viscosity of a coating composition during typical brush and roller application conditions. The ICI viscosity is measured at 10,000 sec$^{-1}$ according to the ASTM D4287-00 method ("Standard Test Method for High-Shear Viscosity Using a Cone/Plate Viscometer").

Gloss

The gloss of coating films is measured according to the ASTM D523 method using a BYK Micro-Tri-Gloss meter.

Pigment Volume Concentration (PVC)

$$PVC = \frac{\text{Volume of the pigment} \times 100}{\text{Volume of pigment} + \text{Volume of solid binder}}$$

Block Resistance

Coating compositions to be tested are casted on scrub vinyl charts using a 6 Mil Bird applicator. The obtained panels then dry in a controlled temperature room (CTR) (25° C. and 50% relative humidity (RH)) for 1 day and 7 days, respectively. Four 1½"×1½" specimens (to run duplicates) are cut out from white area of each cured panel. Every two specimens are then stacked together with coated surfaces face to face and then placed the specimen in a 50° C. oven on a flat metal plate. A heated solid rubber stopper is placed on top of the stacked specimens and a heated 1000 g weight is placed on the stopper. After 30 minutes, the stopper and weight are removed and the specimens are then removed from the oven. The specimens are allowed to cool at room temperature for 30 minutes. After cooling, the two stacked specimens are then separated from each other with slow and steady force by pulling apart at an angle of approximately 180°. The block resistance is reported on a numerical scale of 0 to 10, which corresponds to a subjective tack and seal rating determined by the operator:

10—no tack, perfect; 9—trace tack, excellent; 8—slight tack, very good; 7—slight tack, good; 6—moderate tack, good; 5—moderate tack, fair; 4—severe tack, no seal, fair; 3—5-25% seal, poor; 2—25-50% seal, poor; 1—50-75% seal, poor; 0—complete seal, very poor.

Block resistance level being 7 or higher is acceptable. The higher the value, the better the block resistance.

Water Resistance Test

Coating compositions to be tested are casted on scrub vinyl charts using a 6 Mil Bird applicator. The obtained panels dry in a CTR (25° C. and 50% RH) for 7 days to form dry coating films with thickness of 50-60 μm. Then the panels are merged in tap water for 4 hours and 24 hours, respectively. After removing the panels from water, blistering and swell of the coating films are inspected visually. Water resistance for 4 hours and 24 hours, respectively, is rated as 1-5 according to the number of blisters as follows, 5—no blister and no appearance change of the coating films;
4—≤1 blister per cm² of the coating films;
3—>1 and ≤2 blisters per cm² of the coating films;
2—3-5 blisters per cm² of the coating films;
1—>5 blisters per cm² of the coating films.

Water resistance (24 hours) being at least 5 is acceptable. 5 score means the best water resistance and 1 means the worst water resistance.

Ethanol Resistance Test

Coating compositions to be tested are casted on scrub vinyl charts using a 6 Mil Bird applicator. The obtained panels then dry in a CTR (25° C.; 50% RH) for 7 days to form dry coating films with thickness of 50-60 μm. A cotton applicator dipped with 95% ethanol solution is used to do double rub over the coating films. Cycles to totally remove the coating films are recorded. Cycles being ≥100 is acceptable. The more the cycles, the better the ethanol resistance.

SEC Analysis

SEC analysis is performed generally by an Agilent 1200. A sample is dissolved in tetrahydrofuran (THF)/formic acid (FA) (5%) with a concentration of 2 mg/mL and then filtered through 0.45 μm polytetrafluoroethylene (PTFE) filter prior to SEC analysis. The SEC analysis is conducted using the following conditions:

Column: One Mixed B columns (7.8×300 mm) in tandem, 66#; column temperature: 40□; mobile phase: THF/FA (5%); flow rate: 1.0 mL/minute; Injection volume: 100 μL; detector: Agilent Refractive Index detector, 40° C.; and calibration curve: PL Polystyrene easy vial Narrow standards with molecular weights ranging from 2,329,000 to 580 g/mol, using polynom 3 fitness.

Open Time Test

Scrub vinyl Leneta charts are secured to an Aluminum Drawdown Plate in a CTR (23° C. and 50% RH). Coating compositions to be tested are drawn down lengthwise on the charts using a 6 mil drawdown bar with wet thickness 150±5 microns. In 1 minute, 12 crosses in the shape of an "X" are made by cutting through the freshly coated wet film using the tip of a brush handle. After 1 minute when the first "X" is made, ¼ of the brush is dipped into the coating composition, and then 12 brush strokes are applied over the first X, followed by brushing other "X" at an interval time of 1 minute between brushing each "X" using the same number of brush strokes for each time. The starting time is recorded as the time when brushing the first "X". The coating composition is allowed to dry for 24 hours in the CTR. Wet edge time is recorded as the latest time when the edge of the drawdown coating film is visible to the naked eye. Repair time is recorded as the latest time when the "X" is no longer visible to the naked eye. The wet edge time being 2 minutes or more and the repair time being 7 minutes or more are acceptable.

Stain Resistance Test

Coating compositions to be tested are drawn down on vinyl charts with 150 μm wet thickness. The obtained panels then dry in a CTR (23° C. and 50% RH) for 7 days to form dry coating films with thickness of 50-60 μm. Then, liquid stains including wine, coffee, blur food dye, and green tea, respectively, are placed on the dried coating films and kept for 30 minutes. The obtained panels are then rinsed with flowing tap water. A cork wrapped with gauze saturated with detergents is fitted on a scrub machine and used to remove stains. Ten cycles are used for liquid stains. Then, the panels are rinsed again and dry in the CTR. The stain resistance is evaluated by stain removal and reported on a numerical scale of 1 to 5:

5: >90% stain removed; 4: 80%-90% stain removed; 3: >70% and <80% stain removed; 2: 60%-70% stain removed; and 1: <60% stain removed.

Stain resistance level being at least 3 is acceptable. 5 means the best stain resistance and 1 means the worst stain resistance.

Preparation of Oligomer 1 (O1)

Preparation of monomer emulsion: DISPONIL Fes-32 surfactant (11.61 grams (g), 31% active) was dissolved in deionized water (414.20 g) with stirring. Then MMA, MAA, PEM, DAAM, and MMP, based on dosages described in Table 1, were slowly added into the resulting surfactant solution to obtain the monomer emulsion.

A solution containing DISPONIL Fes-32 surfactant (3.87 g, 31% active) and deionized water (1667.4 g) was added into a 4-neck, 5-liter round bottom flask equipped with a thermocouple, a cooling condenser and an agitator, and was heated to 85° C. under a nitrogen atmosphere. An aqueous APS initiator solution (0.88 g APS in 56.48 g deionized water) and 5.0% by weight of the monomer emulsion obtained above were then added into the flask. Within about 5 minutes, initiation of polymerization was confirmed by a temperature increase by 3° C. and a change of the external appearance of the reaction mixture. After heat generation stopped, the remaining monomer emulsion was added gradually to the flask over a period of 60 minutes with stirring, and an aqueous APS initiator solution (2.06 g APS in 131.34 g deionized water) was added gradually to the flask over a period of 70 minutes. And the temperature was maintained at 84-86° C. After the monomer emulsion and initiator solution were consumed, the reaction mixture was held for 30 minutes. An aqueous ammonia solution (250 g, 12.5% active) was added into the reactor over 15 minutes and held for 20 minutes to dissolve or partially dissolve the resulting oligomer O1. Properties of the oligomer O1 are summarized in Table 1.

Preparation of Oligomers 2-5 (O2-O5)

The oligomers O2-O5 were prepared according to the same procedure as described above for preparing the oligomer O1, based on formulations described in Table 1. The oligomers O3-O5 were prepared as comparative oligomers. Properties of the obtained oligomers O2-O5 are summarized in Table 1.

TABLE 1

|    | MMA    | DAAM  | MAA   | PEM   | AAEM  | MMP   | Solids, wt % | pH value | $T_g^a$, °C. | $M_w^b$ |
|----|--------|-------|-------|-------|-------|-------|--------------|----------|--------------|---------|
| O1 | 828.29 | 33.51 | 65.13 | 30.65 |       | 18.86 | 27.23        | 9.95     | 104          | 14,073  |
| O2 | 828.29 | 33.51 | 65.13 | 30.65 |       | 11.49 | 26.24        | 10.01    | 104          | 24,429  |
| O3 | 828.29 | 33.51 | 65.13 | 30.65 |       | 7.66  | 24.58        | 10.0     | 104          | 34,930  |
| O4 | 828.29 |       | 65.13 | 30.65 | 33.51 | 18.86 | 27.17        | 9.95     | 104          |         |
| O5 | 828.29 | 33.51 | 95.78 |       |       | 18.86 | 28.06        | 8.64     | 104          |         |

$^a T_g$ calculated by the Fox Equation described above;
$^b M_w$ measured by the SEC analysis described above.

Preparation of Multistage Emulsion Polymer (MP Emulsion Polymer)

Preparation of Monomer Emulsion 1: RHODAFAC RS-610-A25 surfactant (13.4 g, 25% active) was dissolved in deionized water (58.9 g), with stirring. Monomer Emulsion 1 was prepared by adding the following monomers slowly to the agitated surfactant solution: 139.8 g BA, 1.7 g ALMA, 167.7 g MMA, and 1.6 g MAA.

Preparation of Monomer Emulsion 2: RHODAFAC RS-610-A25 surfactant (39.9 g, 25% active) was dissolved in deionized water (124.3 g), with stirring. Monomer Emulsion 2 was prepared by adding the following monomers slowly to the agitated surfactant solution: 276 g MMA, 163 g BA, 7.9 g DAAM, 4.6 g BP and 15.8 g UMA (50% active).

A solution containing POLYSTEP B-11 (58% active, 3.2 g) and deionized water (500 g) was placed in a 3 liter 4-neck round-bottom flask equipped with a thermocouple, a cooling condenser and an agitator, and heated to 85° C. under nitrogen. An aqueous sodium persulfate (SPS) initiator solution (1.6 g SPS in 8.6 g deionized water), and 43 g of Monomer Emulsion 1 were added to the flask. In about 5 minutes, initiation of polymerization was confirmed by the increase of temperature by 3° C. and a change of the external appearance of the reaction mixture. After generation of heat had ended, the remainder of the Monomer Emulsion 1 was added gradually to the flask over a period of 105 minutes, with stirring. Polymerization reaction temperature was maintained at 84 to 86° C. After completing the addition, the vessel that containing the Monomer Emulsion 1 and the feeding pipes leading into the flask were rinsed with 17.2 g deionized water, and the rinse was added back to the flask.

Then, a slurry of 10.7 g IA in 10.7 g hot water was added into the flask and the vessel containing the slurry was rinsed with 14.2 g water and the rinse was added back to the flask. Monomer Emulsion 2 was then added in the same manner as Monomer Emulsion 1 over 60 minutes. Upon completing the addition, the reaction mixture was held at 70° C. for 45 minutes, then neutralized by 9.0 g ammonia (30%) and rinsed by 10.3 g water. The reaction was cooled to 45° C. ADH slurry (3.9 g in 8.6 g water) was post added into the reactor over 10 minutes and rinsed by 8.6 g water and then held for 10 minutes. The reaction was cooled to room temperature to get a final MP polymer emulsion.

Examples (Exs) 1-2 and Comparative (Comp) Exs A-C

Coating compositions of Exs 1-2 and Comp Exs A-C comprising the oligomer and MP emulsion polymer obtained above were prepared based on formulations described in Table 2. Ingredients of the grind were mixed using a conventional lab mixer. The binder was added into the grind. Then other ingredients of the let down were added into the resultant mixture. Properties of the coating compositions and dry coating films made therefrom were measured according to the test methods described above and results are listed in Table 3.

Exs 3-5 and Comp Exs D-J

Coating compositions of Exs 3-5 and Comp Exs D-J were prepared according to the same procedure and substantially the same formulation as described above in Ex 1, except that different open time additive (OTA) and/or different dosage of OTA were used based on formulations described in Tables 4-5. The obtained coating compositions were evaluated according to the test methods described above. Properties of the coating compositions and dry coating films made therefrom are listed in Tables 4-5.

All the coating compositions obtained above had a volume solid content of 37.05% and a pigment volume concentration (PVC) of about 19.23%. The gloss level of dry coating films made from these coating compositions was about 70-85 at 60°.

TABLE 2

|  | Comp Ex A | Comp Ex B | Ex 1 | Ex 2 | Comp Ex C |
| --- | --- | --- | --- | --- | --- |
| Grind, gram | | | | | |
| Water | 50.00 | 50.00 | 50.00 | 50.00 | 50.00 |
| OROTAN 731A (dispersant) | 15.00 | 15.00 | 15.00 |  | 15.00 |
| Oligomer O1 (dispersant and OTA) |  |  |  | 15.00 |  |
| Tergitol 15-S-9 | 1.50 | 1.50 | 1.50 | 1.50 | 1.50 |
| BYK-022 | 2.00 | 2.00 | 2.00 | 2.00 | 2.00 |
| AMP-95 | 0.50 | 0.50 | 0.50 | 0.50 | 0.50 |
| Ti-Pure R-706 | 285.00 | 285.00 | 285.00 | 285.00 | 285.00 |
| Acticide EPW | 2.00 | 2.00 | 2.00 | 2.00 | 2.00 |
| Water | 10.00 | 10.00 | 10.00 | 10.00 | 10.00 |
| Grind Sub-total | 366.00 | 366.00 | 366.00 | 366.00 | 366.00 |
| Let Down, gram | | | | | |
| MP emulsion polymer (binder) | 760.00 | 760.00 | 760.00 | 760.00 | 760.00 |
| Triethylene glycol monoethyl ether | 30.00 | 30.00 | 30.00 | 30.00 | 30.00 |
| Texanol | 15.00 | 15.00 | 15.00 | 15.00 | 15.00 |
| BYK-024 | 1.00 | 1.00 | 1.00 | 1.00 | 1.00 |
| Acrysol RM-5000 | 30.00 | 30.00 | 30.00 | 30.00 | 30.00 |
| Acrysol RM-8 | 4.00 | 4.00 | 4.00 | 4.00 | 4.00 |
| Water | 20.00 | 20.00 | 20.00 | 20.00 | 20.00 |
| AMP-95 | 1.00 | 1.00 | 1.00 | 1.00 | 1.00 |
| RHODAFAC RS-410 | 3.00 | 3.00 | 3.00 | 3.00 | 3.00 |
| Oligomer O1 (OTA) |  |  | 29.00 |  |  |
| GLUCOPON 425 N/HH (OTA) |  | 29.00 |  |  |  |
| Oligomer O5 (OTA) |  |  |  |  | 29.00 |
| Water | 28.32 | 0.47 | 0.71 | 28.32 | 0.71 |
| Totals Weight (g) | 1258.32 | 1258.32 | 1258.32 | 1258.32 | |
| Total Volume (ml) | 1000 | 1000 | 1000 | 1000 | |

As shown in Table 3, the coating composition of Comp Ex A containing no OTA showed short open time (e.g., wet edge time: 1 minute, repair time: 4 minutes). By post adding 4.24% (by solids weight based on the solids weight of the MP emulsion polymer) GLUCOPON 425 N/HH, the coating composition of Comp Ex B showed improved open time. However, the viscosity (KU/ICI/BF) of the coating composition of Comp Ex B was significantly decreased. Dry coating films made from Comp Ex B also showed poor stain resistance. The coating composition of Comp Ex C comprising 2.37% (by solids weight based on the solids weight of the MP emulsion polymer) oligomer O5 that contained no polymerized unit of PEM demonstrated poor open time.

In contrast, with post addition of 2.32% (by solids weight based on the solids weight of the MP emulsion polymer) oligomer O1, the coating composition of Ex 1 showed improved open time and significantly increased viscosity (KU/ICI/BF) while maintaining properties of dry coating films obtained therefrom, e.g., stain resistance. In the coating composition of Ex 2, 1.20% (by solids weight based on the solids weight of the MP emulsion polymer) oligomer O1 instead of OROTAN 731 A in the grind stage acted as a dispersant and dispersed the pigment well, and also significantly increased the viscosity (KU/ICI/BF) and extended the open time of the coating composition, while maintaining properties of dry coating films such as gloss and stain resistance.

TABLE 3

|  |  | Comp Ex A | Comp Ex B | Ex 1 | Ex 2 | Comp Ex C |
| --- | --- | --- | --- | --- | --- | --- |
| Viscosity (KU/ICI/BF), Equilibrium @ 25° C., centipoises | | 96/1.8/2720 | 84/1.55/1440 | 99/1.9/4080 | 103/1.8/3733 | 110/2.1/6000 |
| Drawdown | 20° gloss | 63 | 63 | 62 | 61 | 64.4 |
|  | 60° gloss | 84 | 83 | 84 | 83 | 84.2 |
| Block resistance | 1 day, 30 min @ 50° C. | 6 | 6 | 6 | 6 | 5 |
|  | 7 days, 30 min @ 50° C. | 10 | 10 | 10 | 10 | 8 |
| Open time, minute | Wet edge time | 1 | 2 | 2 | 2 | 1 |
|  | Repair time | 4 | 8 | 8 | 7 | 6 |
| Stain resistance (7 day cure @ 23° C.) | | 3 | 2 | 3 | 3 | N/A |

As shown in Table 4, the coating compositions of Exs 3 and 4 comprising 3% and 5% oligomer O1, respectively, showed increased open time and provided dry coating films with good properties such as stain resistance, water resistance, block resistance and ethanol resistance. Addition of 8% and 10% oligomer O1, respectively, increased the open time of the coating compositions of Comp Exs D and E, but provided dry coating films made therefrom with unacceptable block resistance and ethanol resistance.

As shown in Table 5, the coating compositions of Comp Exs F and G comprising oligomer O3 ($M_w$: about 34,930) as OTAs at a dosage of 3% and 5%, respectively, showed poor open time. As compared to the coating compositions of Comp Exs F and G, the coating composition of Ex 5 comprising 5% oligomer O2 ($M_w$: 24,429) as OTA showed extended open time while providing dry coating film with good properties. In addition, the HG-3361 binder-containing coating compositions of Comp Exs H-J containing no OTA, 3% and 8% oligomer O4, respectively, all showed poor open time and provided dry coating films with poor ethanol resistance.

TABLE 4

|  |  | Ex 3 | Ex 4 | Comp Ex D | Comp Ex E |
|---|---|---|---|---|---|
| Binder |  | MP emulsion polymer | MP emulsion polymer | MP emulsion polymer | MP emulsion polymer |
| OTA |  | 3% oligomer O1 | 5% oligomer O1 | 8% oligomer O1 | 10% oligomer O1 |
| Drawdown | 20° gloss | 40.7 | 39.2 | 46.9 | 42.6 |
|  | 60° gloss | 73.9 | 72.1 | 75.7 | 73.5 |
| Open time, minute | Wet edge time | 2 | 2 | 4 | 3 |
|  | Repair time | 6 | 8 | 10 | 12 |
| Water resistance | 4 hours | 5 | 5 | 5 | 5 |
|  | 24 hours | 5 | 5 | 5 | 5 |
| Stain resistance |  | 3 | 3 | 3 | 3 |
| Block resistance (7 days) |  | 8 | 9 | 6 | 5 |
| Ethanol resistance, cycles |  | >200 | 150 | 80 | 80 |

TABLE 5

|  |  | Comp Ex F | Comp Ex G | Ex 5 | Comp Ex H | Comp Ex I | Comp Ex J |
|---|---|---|---|---|---|---|---|
| Binder |  | MP emulsion polymer | MP emulsion polymer | MP emulsion polymer | HG-3361 | HG-3361 | HG-3361 |
| OTA |  | 3% oligomer O3 | 5% oligomer O3 | 5% oligomer O2 | Nil | 3% oligomer O4 | 8% oligomer O4 |
| Drawdown | 20° gloss | 46.9 | 47.8 | 42.8 | 63.4 | 48.5 | 49.4 |
|  | 60° gloss | 78 | 75.8 | 74.8 | 84.3 | 77.9 | 76.7 |
| Open time, minute | Wet edge time | 1 | 1 | 2 | 1 | 1 | 2 |
|  | Repair time | 4 | 4 | 7 | 1 | 5 | 4 |
| Water resistance | 4 hours | 5 | 5 | 5 | 5 | 5 | 5 |
|  | 24 hours | 5 | 5 | 5 | 5 | 5 | 5 |
| Stain resistance |  | 4 | 5 | 3 | 3 | 3 | 3 |
| Block resistance (7 days) |  | 8 | 10 | 9 | 9 | 10 | 8 |
| Ethanol resistance, cycles |  | 200 | >200 | >200 | 30 | 43 | 30 |

What is claimed is:

1. An aqueous coating composition, comprising:
   (i) an emulsion polymer having a weight average molecular weight more than 80,000;
   (ii) an oligomer comprising as polymerized units, based on the weight of the oligomer,
   (a1) from 75% to 92% by weight of a hydrophilic (meth)acrylic acid alkyl ester;
   (a2) from 2.1% to 10% by weight of diacetone (meth)acrylamide; and
   (a3) from 5% to 15% by weight of acid monomers comprising from 4% to 14% by weight of an α,β-ethylenically unsaturated carboxylic acid and from 1% to 9% by weight of a phosphorous-containing acid monomer;
   wherein the oligomer has a weight average molecular weight of from 6,000 to 30,000; and the oligomer is present in an amount of from 1% to 7.5% by weight, based on the dry weight of the emulsion polymer; and
   (iii) a polyfunctional carboxylic hydrazide containing at least two hydrazide groups per molecule.

2. The coating composition of claim 1, wherein the oligomer is present in an amount of from 1.3% to 6% by weight, based on the dry weight of the emulsion polymer.

3. The coating composition of claim 1, wherein the oligomer has a weight average molecular weight of from 6,000 to 28,000.

4. The coating composition of claim 1, wherein the phosphorous-containing acid monomer is selected from phosphoethyl (meth)acrylate, phosphopropyl (meth)acrylate, phosphobutyl (meth)acrylate, or mixtures thereof.

5. The coating composition of claim 1, wherein the hydrophilic (meth)acrylic acid alkyl ester is selected from methyl (meth)acrylate, ethyl (meth)acrylate, or mixtures thereof.

6. The coating composition of claim 1, wherein the oligomer comprises as
   polymerized units, based on the weight of the oligomer,
   (a1) from 80% to 90% by weight of the hydrophilic (meth)acrylic acid alkyl ester;
   (a2) from 3% to 6% by weight of diacetone (meth)acrylamide; and
   (a3) from 7% to 13% by weight of the acid monomers comprising from 5% to 10% by weight of the α,β-ethylenically unsaturated carboxylic acid and from 3% to 6% by weight of the phosphorous-containing acid monomer.

7. The coating composition of claim 1, wherein the polyfunctional carboxylic hydrazide is selected from adipic dihydrazide, oxalic dihydrazide, isophthalic dihydrazide, polyacrylic polyhydrazide, or mixtures thereof.

8. The coating composition of claim 1, wherein the emulsion polymer is selected from an acrylic polymer, a styrene-acrylic copolymer, a blend of polyurethane and an acrylic polymer or copolymer, a polyurethane-acrylic hybrid polymer, or mixtures thereof.

9. The coating composition of claim 1, wherein the emulsion polymer comprises, as polymerized units, diacetone (meth)acrylamide.

10. The coating composition of claim 1, further comprising (iv) pigments and/or extenders.

11. A process of preparing an aqueous coating composition of claim 1 comprising: admixing (i) an emulsion polymer, (ii) an oligomer, and (iii) a polyfunctional carboxylic hydrazide containing at least two hydrazide groups per molecule;
  wherein the emulsion polymer has a weight average molecular weight more than 80,000, and the oligomer comprises as polymerized units, based on the weight of the oligomer,
  (a1) from 75% to 92% by weight of a hydrophilic (meth) acrylic acid alkyl ester;
  (a2) from 2.1% to 10% by weight of diacetone (meth) acrylamide; and
  (a3) from 5% to 15% by weight of acid monomers comprising from 4% to 14% by weight of an α,β-ethylenically unsaturated carboxylic acid and from 1% to 9% by weight of a phosphorous-containing acid monomer;
  wherein the oligomer has a weight average molecular weight of from 6,000 to 30,000;
  and the oligomer is present in an amount of from 1% to 7.5% by weight, based on the dry weight of the emulsion polymer.

12. The process of claim 11, wherein the coating composition further comprises pigments and/or extenders.

13. The process of claim 12, wherein the pigments and/or extenders are first mixed with the oligomer in the absence of a dispersant prior to adding to the coating composition.

14. A method of extending open time of an aqueous coating composition comprising an emulsion polymer and a polyfunctional carboxylic hydrazide containing at least two hydrazide groups per molecule, comprising:
  admixing the emulsion polymer and the polyfunctional carboxylic hydrazide with an oligomer,
  wherein the emulsion polymer has a weight average molecular weight more than 80,000, and the oligomer comprises as polymerized units, based on the weight of the oligomer,
  (a1) from 75% to 92% by weight of a hydrophilic (meth) acrylic acid alkyl ester;
  (a2) from 2.1% to 10% by weight of diacetone (meth) acrylamide; and
  (a3) from 5% to 15% by weight of acid monomers comprising from 4% to 14% by weight of an α,β-ethylenically unsaturated carboxylic acid and from 1% to 9% by weight of a phosphorous-containing acid monomer;
  wherein the oligomer has a weight average molecular weight of from 6,000 to 30,000;
  and the oligomer is present in an amount of from 1% to 7.5% by weight, based on the dry weight of the emulsion polymer.

* * * * *